United States Patent [19]

Denis et al.

[11] Patent Number: 5,145,632
[45] Date of Patent: Sep. 8, 1992

[54] PROCESS FOR THE MANUFACTURE OF PET CONTAINERS DESIGNED TO BE FILLED WITH A HOT LIQUID

[75] Inventors: Gerard Denis, Turretot; Jean-Michel Ruis, Maneglise; Paul La Barre, Sainte Adresse, all of France

[73] Assignee: Sidel, La Havre, France

[21] Appl. No.: 545,179

[22] Filed: Jun. 28, 1990

[30] Foreign Application Priority Data

Jun. 29, 1989 [FR] France .................................. 89 08865

[51] Int. Cl.⁵ ............................................. B29C 49/18
[52] U.S. Cl. ..................... 264/521; 264/526; 264/529; 264/532; 264/535; 425/526; 425/529; 425/530
[58] Field of Search ............... 264/521, 520, 526, 528, 264/529, 532, 535; 425/526, 529, 530

[56] References Cited

U.S. PATENT DOCUMENTS

| | | | |
|---|---|---|---|
| 3,752,629 | 2/1972 | Gordon | 425/305 |
| 3,873,661 | 3/1975 | Kontz | 264/526 |
| 3,888,961 | 6/1975 | Schonewald | 264/528 |
| 4,076,071 | 2/1978 | Rosenkranz et al. | 264/535 |
| 4,244,913 | 1/1981 | Ryder | 264/528 |
| 4,285,657 | 8/1981 | Ryder | 264/528 |
| 4,385,089 | 5/1983 | Bonnebat et al. | 264/523 |
| 4,396,816 | 8/1983 | Krishnakumar et al. | 264/535 |
| 4,476,170 | 10/1984 | Jaborin | 428/36.92 |
| 4,512,948 | 4/1985 | Jaborin | 264/521 |
| 4,606,723 | 3/1985 | Pasternicki | 432/124 |
| 4,927,680 | 5/1990 | Collette et al. | 264/535 |

FOREIGN PATENT DOCUMENTS

| | | | |
|---|---|---|---|
| 0280742 | 9/1988 | European Pat. Off. | |
| 1960129 | 7/1970 | Fed. Rep. of Germany | 264/528 |
| 53-074570 | 7/1978 | Japan | 264/532 |

OTHER PUBLICATIONS

Modern Plastics Encyclopedia 1988, Oct. 1987, pp. 532–533.

Ringwald, E. L., *Polymer Handbook*, "Physical Constants of Poly(Ethylene Terephthalate)" Brandrup–Immergut (Jun. 1967).

Vieth, Wolf R., "Orientation Factors Affecting the $CO_2$ Permeability of PET," Business & Technical Papers, Mar. 17–19, 1981, at the 5th Annual International Conference on Oriented Plastic Containers.

*Primary Examiner*—Jan H. Silbaugh
*Assistant Examiner*—Catherine Timm
*Attorney, Agent, or Firm*—Sughrue, Mion, Zinn, Macpeak & Seas

[57] ABSTRACT

A process for the manufacture of a polyethylene terephthalate (PET) container from a hollow amorphous PET preform which includes an open end and a closed end, the open end forming a neck section having dimensions already conformed to its final size and shape, the container being able to withstand relatively severe thermal conditions encountered when the container is filled with a hot liquid, without appreciable deformation, including the steps of: a) rapidly heating only the body of the PET preform, exclusive of the neck section, to a temperature at which subsequent longitudinal and transverse stretching cause no stresses in the PET; b) transferring the hot preform from step (a) to a mold whose walls are maintained at a temperature lower than the temperature of the hot preform body; c) longitudinally stretching the preform body while simultaneously transversely expanding it by blow-molding using a pressurized fluid so as to mold the preform body to the shape of the mold cavity; d) rapidly evacuating the pressurized fluid from the molded container of step (c); and e) removing the container from the mold.

9 Claims, 3 Drawing Sheets

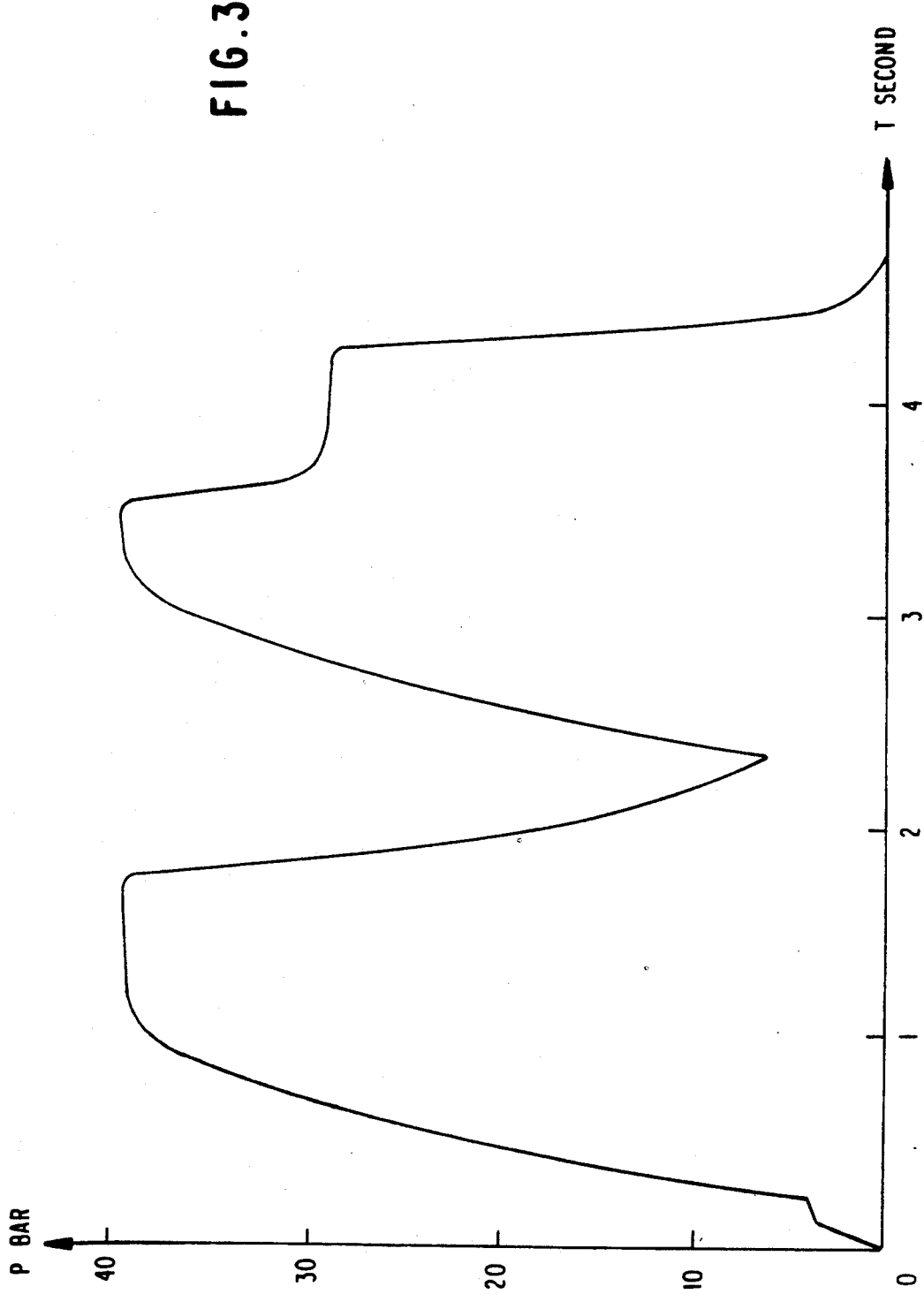

PROCESS FOR THE MANUFACTURE OF PET CONTAINERS DESIGNED TO BE FILLED WITH A HOT LIQUID

FIELD OF THE INVENTION

The present invention relates to a process for the manufacture of containers made of polyethylene terephthalate (PET) from hollow preforms comprising an open end, which, during use and without appreciable deformation, are capable of withstanding relatively severe thermal conditions such as those encountered when the containers are filled with a hot liquid.

BACKGROUND OF THE INVENTION

In the packaging field, containers made of biaxially-oriented or bioriented PET are now widely used for packaging carbonated and non-carbonated drinks, juices, and sauces. This is because biaxially-oriented PET has good mechanical strength, a good appearance, and high chemical inertia as regards the products in these containers. Moreover, it forms an effective barrier to the gases contained in the liquids and to the oxygen in the air, thus providing preservation of the products contained therein without oxidation.

It is known that containers made of biaxially-oriented PET obtained by the stretching and blowing of a preform raised to the PET biorientation temperature undergo considerable shrinkage when raised to a temperature greater than the glass transition temperature (Tg) of the PET, a phenomenon which makes them generally unsuited for filling with a hot substance.

This shrinkage results from the fact that the internal stresses created in the material during its biaxial-orientation (longitudinal stretching together with blowing, which causes a transversely-directed stretching) are released when the container is heated to a temperature greater than the glass transition temperature (Tg) of the material.

In this regard, it is well known that the thermal stability of containers made of biaxially-oriented PET produced by stretching-blowing is substantially increased by means of a thermal treatment, commonly known as thermofixation. In this procedure, a preform heated to a temperature suitable for biaxial-orientation is stretched bi-axially in a blowing mold so as to form an intermediate container.

Next, while this intermediate container is still in contact with the walls of the blowing mold, it is heated to a higher temperature for a certain period, thus causing it to undergo thermofixation.

Finally, the thermofixed container, which is kept under pressure so as to withstand temperature-induced shrinkage, is cooled to a temperature at which it preserves its shape when not under pressure. According to the many publications dealing with thermofixation, the temperatures suitable for the implementation of this thermal treatment generally range between 140° C. and 250° C.

Another procedure is known in which a preform, heated to a bi-axial orientation temperature, is blown in a hot mold and kept in contact with the walls of this mold. The temperature of the walls may be 40° C. greater than the minimum orientation temperature. In a first embodiment, the molded container thus obtained is cooled to a moderate degree, by causing its temperature to fall by 10° to 30° C. following the introduction of a cooling fluid into the interior of the container. The cooled container is then removed from the blowing mold. In a second embodiment, the container thus formed is allowed to retract freely within the mold by effecting the partial or total decompression of the blowing fluid; the container is then blown once again in the same hot mold or in another cooled one. The container is then removed from the mold. In accordance with embodiments of this procedure, the stretching-blowing of the polyethylene terephthalate (PET) preforms occurs at 95° in a hot mold whose temperature, kept continuously greater than the temperature of the preforms, ranges between 110° and 140° C. The contact times between the molded container and the walls of the hot mold are approximately 10 seconds.

These known procedures, however, give rise to certain disadvantages, such as the use of molds at relatively high temperatures (up to 250° C.), the long periods during which the container is kept in the blowing mold, the use of several successive molds, and the use of costly cooling fluids. As a result, these procedures are difficult to implement on an industrial scale and lead to lower rates of container production.

SUMMARY OF THE INVENTION

Therefore, one goal of the present invention is to overcome the disadvantages mentioned above and to provide a procedure allowing high-rate industrial manufacture of heat-resistant PET containers which show no appreciable deformation.

Accordingly, a main purpose of the present invention is to provide a process for the manufacture of a polyethylene terephthalate (PET) container from a hollow amorphous PET preform comprising an open end and a closed end, the open end forming a neck section having dimensions already conformed to its final size and shape, the container being able to withstand relatively severe thermal conditions encountered when the container is filled with a hot liquid, without appreciable deformation, comprising:

a) rapidly heating only the body of said PET preform, exclusive of the neck section, to a temperature at which subsequent longitudinal and transverse stretching cause no stresses in the PET;

b) transferring said hot preform from step (a) to a mold whose walls are maintained at a temperature lower than the temperature of the hot preform body;

c) longitudinally stretching the preform body while simultaneously transversely expanding it by blow-molding using a pressurized fluid so as to mold the preform body to the shape of the mold cavity;

d) rapidly evacuating the pressurized fluid from the molded container of step (c); and e) removing said container from the mold.

Other features and advantages of the present invention will be apparent from the following description and the attached drawings.

BRIEF DESCRIPTION OF THE DRAWINGS

FIGS. 1, 2 and 3 each illustrate a graph showing variations in the blowing pressure as a function of time for three preferred embodiments of the process of the present invention, which are described further below.

DETAILED DESCRIPTION OF THE INVENTION

Figure 1:
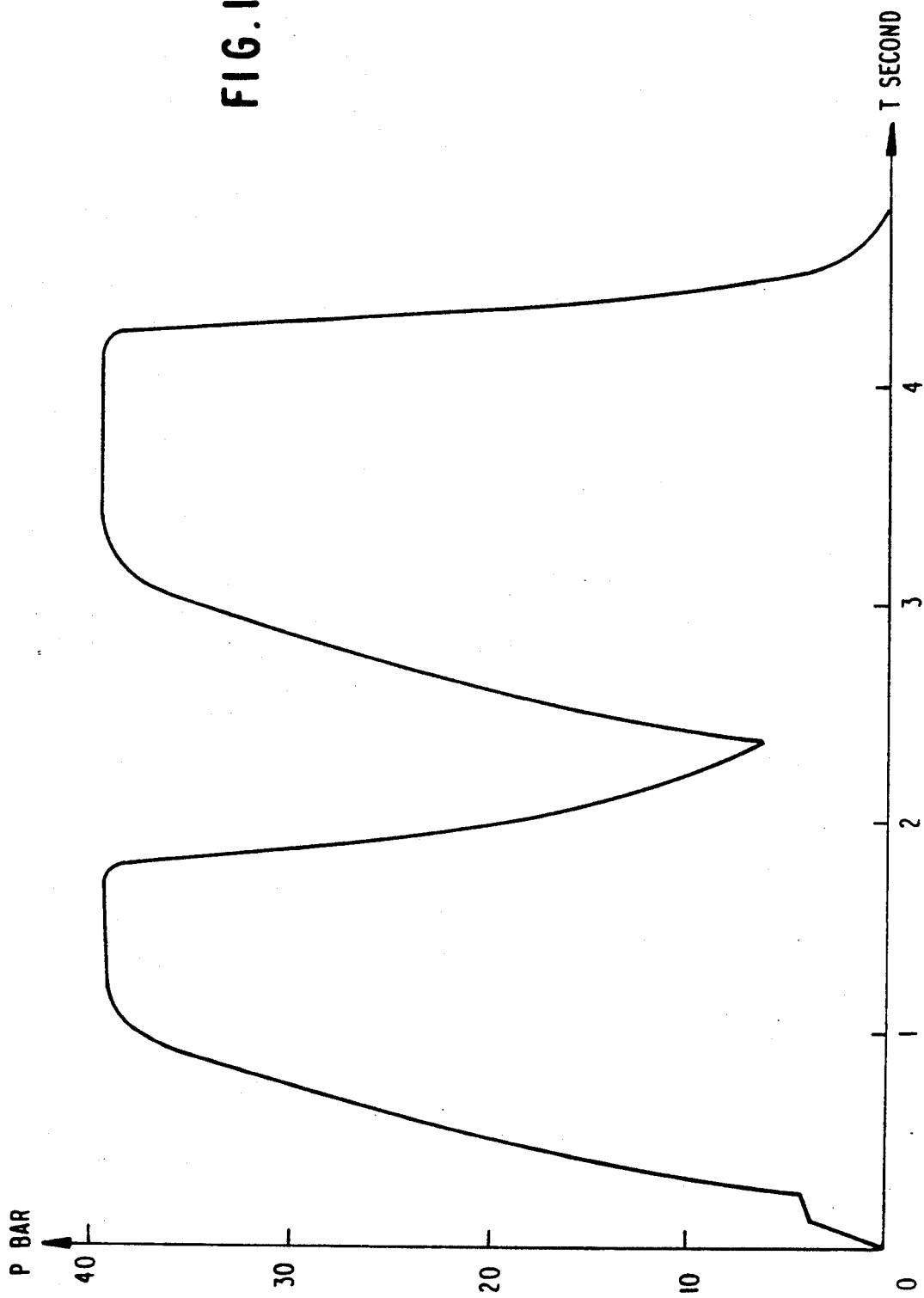

Containers manufactured from saturated, biaxially-oriented polyester resins such as PET exhibit considerable shrinkage when heated to temperatures greater than the glass transition temperature (Tg) of the resin. This shrinkage results from the fact that the internal stresses created in the polyester resin during its biaxial orientation are released when the containers are heated to a temperature greater than Tg.

The present invention is based on the finding that the PET is amorphous and not biaxially-oriented when manufactured from preforms. Thus, virtually no internal stresses causing shrinkage and deformation are created. Accordingly, the containers produced according to the method of the present invention show no appreciable or significant (from a practical standpoint) deformation when heated to a temperature greater than Tg, particularly when filled with a liquid whose temperature reaches, and even exceeds, 85° C.

In order not to cause biorientation in the PET material making up the containers, the following steps are taken:

a) The preforms are stretched longitudinally and simultaneously blow-molded, stretching them transversely. The preforms have been previously heated to a temperature high enough so that these simultaneous stretching operations do not cause biorientation, and therefore cause no stresses, in the PET.

b) A relatively low biaxial stretching factor is used during the transformation of the preforms into containers by stretching-blowing (biaxial stretching factor = longitudinal stretching factor x transverse stretching factor caused by blowing).

c) The rate of longitudinal stretching is adjusted so as to induce the fewest stresses possible in the material during molding.

More specifically, the following preferred values are considered applicable to producing a PET container in accordance with the present invention:

The body of the preform, except for the neck section which is already conformed to its final shape and size, is rapidly heated in an infrared radiating oven, preferably to a temperature of between 120° and 140° C. Heating preferably lasts less than one minute, and most preferably about 40 seconds.

Furthermore, to ensure that the temperature of the PET does not fall too precipitously during stretching and blowing, the walls of the blowing-mold cavity are preferably kept at a temperature of between 70° and 120° C. The temperature of the mold cavity walls is adjusted, moreover, so as to remain continuously less than the temperature of the preform enclosed in the cavity.

Thus, during molding, the material forming the container is prevented from cooling below its glass transition temperature Tg. However, the central portion of the mold bottom, which is in contact with the thickest part of the container, is preferably cooled to a temperature of between 10° and 50° C. Further, the portion of the mold-cavity walls corresponding to the area in which the shoulder and the neck section of the container meet may also preferably be cooled to a temperature of between from 10° to 50° C.

The biaxial stretching factor ranges between 7 and 9, a relatively low factor when compared with the stretching factor often used for production of PET containers (10 to 13).

The longitudinal stretching rate is less than 500 mm/sec, a value which is appreciably lower than the values normally used for PET (from 650 to 850 mm/sec).

The pressurized fluid is preferably a gaseous fluid, and normally air is used.

A preferred molding operation whereby a container is formed from a preform in accordance with the present invention will now be described in further detail.

A preform, having a neck section already conformed to its final dimensions, is rapidly heated (exclusive of the neck section) to a temperature of between 120° and 140° C., is placed in the cavity of a mold and held in position by its neck. The walls of the mold cavity are kept at a temperature of between 70° and 120° C., this temperature being constantly less than that of the heated preform.

According to a first preferred embodiment of the present invention (see FIG. 1), a stretching rod is inserted in the preform through its neck, and is moved along the longitudinal axis of the preform to stretch the preform body longitudinally. The stretching rod is moved until the closed end of the preform comes into contact with the bottom of the mold cavity. Simultaneously with the stretching, pressurized air is blown into the preform so as to force the container material to come into contact with the mold cavity, thereby causing the container to mold to the shape of the mold cavity. The pressure at the end of the blowing operation within the molded container ranges between 20 and 40 bars, depending on the complexity and size/shape of the container undergoing production.

The blowing air is then rapidly drawn away by aeration of the container, in such a way that the residual pressure within the container ranges between 0 and 6 bars.

Next, pressurized air is once again blown into the container held in the mold cavity, the pressure at the end of this second blowing operation ranging between 20 and 40 bars.

Finally, the air from the second blowing operation contained in the container in the mold is rapidly drawn off by aeration of the container, so as to reduce its internal pressure to atmospheric pressure, and the finished container is removed from the blowing mold. The container temperature upon removal from the mold ranges between 70° and 80° C., since the rapid pressure reduction of the pressurized air within the container has ensured cooling from the inside.

The mold retention time required to produce a container from a preform preferably ranges between 4 and 5.5 seconds.

Figure 2:
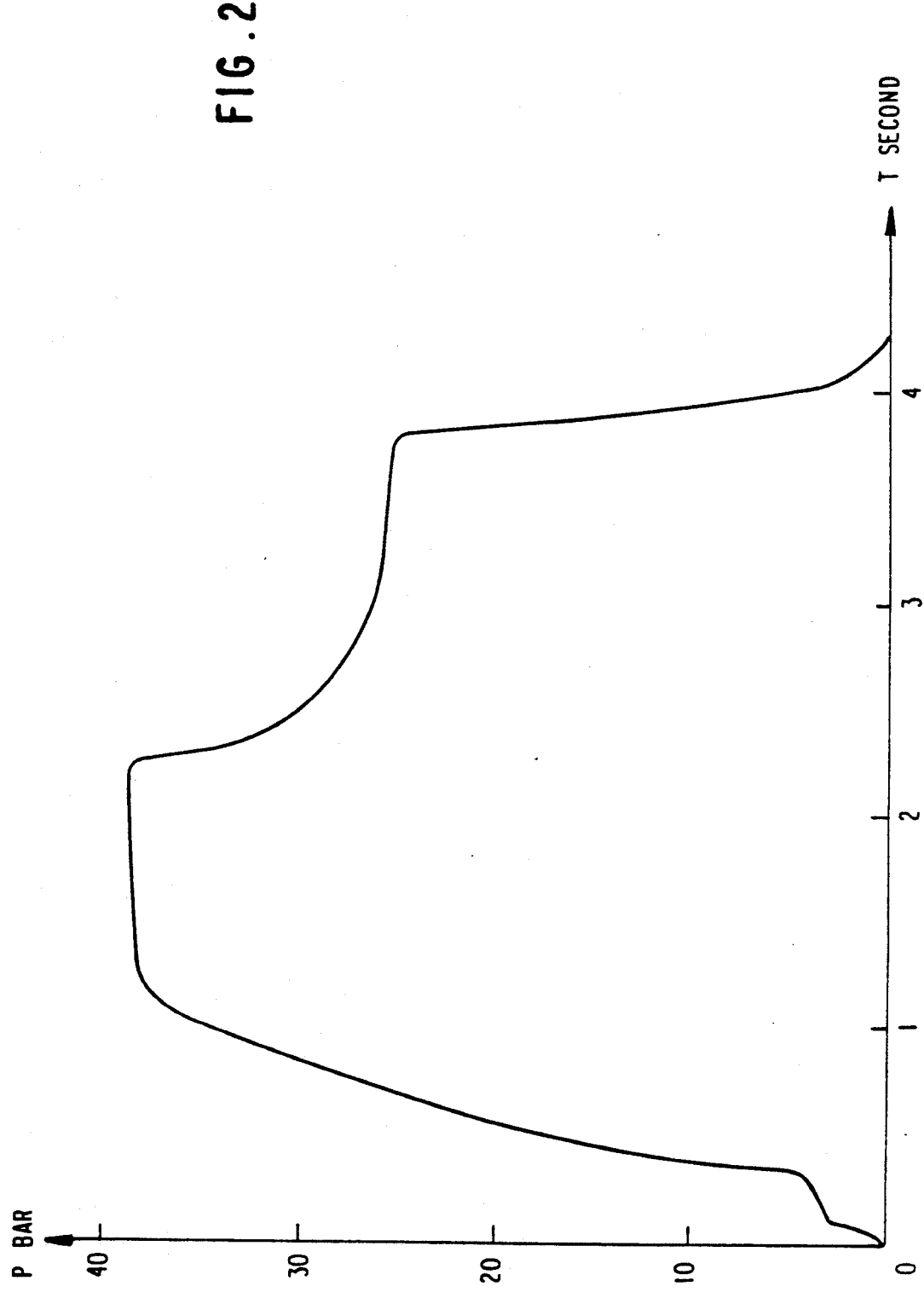

According to a second preferred embodiment of the present invention (see FIG. 2), the stretching phase is conducted in the manner as previously described, while the blowing phase is carried out as follows. Simultaneously with the stretching, pressurized air is blown into the preform so as to force the container material to come into contact with the mold cavity and to take on its shape. The pressure at the end of the blowing phase within the molded container ranges between 20 and 40 bars. The molded container positioned in the mold is then aerated by means of the hollow stretching rod, while the pressurized air continues to be introduced into the container using a blowing nozzle. Air is thus forced to circulate within the shaped container while the container is kept under excess pressure (15 to 30 bars) as compared with atmospheric pressure. Air circulation is then arrested, and the air within the container is rapidly drawn off. Finally, the completed container is removed from the mold.

Circulating air and the final pressure reduction of the pressurized air within the container have cooperated to effectively cool the container, whose temperature ranges between 70° and 80° C. when removed from the mold.

Retention time in the mold required to produce a container from a preform preferably ranges between 4 and 5.5 seconds.

According to a third preferred embodiment of the present invention, (see FIG. 3), the stretching and blowing phases are carried out in the same manner as in the first preferred embodiment described previously. However, at the end of the second blowing operation, during which the final pressure ranges between 20 and 40 bars, the molded container in the mold is aerated using the hollow stretching rod, while pressurized air continues to be introduced into the container by means of a blowing nozzle.

A circulating air current is thus created within the shaped container, while keeping it under excess pressure (15 to 30 bars) as compared to atmospheric pressure. The circulating air is then arrested and the pressure within the container is made to fall rapidly by drawing off the air until pressure reaches atmospheric pressure.

Here again, retention time in the mold needed to produce a container from a preform preferably ranges between 4 and 5.5 seconds.

A primary advantage of the present invention lies in the fact that it allows the production at an industrial manufacturing rate of resistant polyethylene terephthalate containers, which are not subject to appreciable deformation when filled with a hot liquid. e.g., one whose temperature may reach 85° C.-87° C. Indeed, retention time in the mold required to produce a container from a preform preferably ranges between only 4 and 5.5 seconds, as compared with a retention time of 2 to 3 seconds for the industrial production of containers intended to be filled with a cold liquid.

Various non-limiting examples of the various modes of implementation of the present invention are given below.

EXAMPLES 1.5 liter bottles weighing 57 grams are manufactured from preforms made of amorphous PET produced by injection. The PET used, which is manufactured by AKZO and marketed under the designation D02.300, has an intrinsic viscosity of 0.75 dl/g.

The preforms are heated in an infrared radiating oven so as to heat the PET to 130° C. They are then transferred and blown at 125° C. in a mold whose molding-cavity walls are kept at a temperature of between 105° and 110° C.

The longitudinal stretching rate is 360 mm/second.

During the stretching-blowing operations, the material is subjected to a longitudinal stretching factor of 2.21 and to a transverse stretching factor of 3.61, thus giving an overall stretching factor of 7.98.

In a first series of tests corresponding to the first preferred embodiment of the present invention described previously, the preforms are stretched by the stretching rod and blown using pressurized air. The pressure reached 39 bars after 1.10 seconds. The stretched material is kept in contact with the heated walls of the molding cavity for 0.64 second under a pressure of 39 bars. The container is then aerated and the pressure falls from 39 to 6 bars in 0.58 second. Next, pressurized air is fed once again into the container, and the pressure rises from 6 to 39 bars in 0.88 second, this pressure of 39 bars being maintained for 1.05 seconds. The container is then aerated, and the pressure falls from 39 bars to atmospheric pressure in 0.6 second. The container is then removed from the mold.

The cycle of fabrication of the containers from preforms using 2 blowing steps lasts a total of 4.84 seconds.

In a second series of tests corresponding to the second preferred embodiment of the present invention described previously, the preforms are stretched using the stretching rod and blown by means of pressurized air. Pressure reaches 38.5 bars after 1.23 seconds. The stretched material is kept in contact with the heated walls of the mold cavity for 1.06 seconds under a pressure of 38.5 bars. The container is then aerated while pressurized air is introduced into the container, thus creating within the container a current of circulating pressurized air, or sweeping. During the sweeping operation, which lasts 1.5 seconds, the pressure falls from 38.5 to 25 bars. Next, the introduction of the sweeping air is arrested, and the pressure falls from 25 bars to atmospheric pressure in 0.45 second. Finally, the container is removed from the mold.

The cycle of fabrication of the containers from preforms using a single blowing step with sweeping lasts a total of 4.24 seconds.

In a third series of tests corresponding to the third preferred embodiment of the present invention described previously, the preforms are stretched using the stretching rod and blown by means of pressurized air. Pressure reaches 39 bars after 1.10 seconds. The stretched material is kept in contact with the heated walls of the mold cavity for 0.64 second under a pressure of 39 bars. The container is then aerated and the pressure falls from 39 to 6 bars in 0.58 second. Next, pressurized air is once again fed into the container, and the pressure rises from 6 to 39 bars in 0.88 second, the pressure of 39 bars being maintained for 1.05 seconds. The container is then aerated while pressurized air is introduced into the container, thus creating within the container a current of circulating pressurized air, or sweeping. During the sweeping operation, which lasts 0.68 second, the pressure falls from 39 to 29 bars. Next, the introduction of the sweeping air is arrested, and the pressure falls from 29 bars to atmospheric pressure in 0.5 second. Finally, the container is removed from the mold.

The cycle of fabrication of the containers from preforms using 2 blowing steps with sweeping lasts a total of 4.74 seconds.

The characteristics of the PET bottles obtained using the three blowing methods are recorded in Table I, below.

TABLE I

|  | Double blowing | Single blowing with sweeping | Double blowing with sweeping |
| --- | --- | --- | --- |
|  | Appearance | | |
|  | Transparent | Transparent | Transparent |
| Volume shrinkage after filling at 85-87° C. (in % as compared with the initial volume) | 0.5 | 1 | 0.8 |
| Reduction of the diameter of the body of the | 0.6 | 0.7 | 0.3 |

TABLE I-continued

|  | Double blowing | Single blowing with sweeping | Double blowing with sweeping |
|---|---|---|---|
| Appearance | Transparent | Transparent | Transparent |
| bottle after filling at 85-87° C. (in %) |  |  |  |
| Reduction of the height of the bottle after filling at 85-87° C. (in %) | 0.5 | 0.6 | 0.8 |

A fourth and fifth series of tests were conducted to demonstrate the importance of the temperature of the preforms and of the temperature of the walls of the molding cavity during stretching-blowing.

The preforms are heated to 100° C. in an infrared radiating oven, then stretched and blown at 90° C. (instead of at 125° C.) in a molding cavity whose walls are kept at 118°-120° C. (instead of at 105°-110° C.). In these tests, the temperature of the walls of the molding cavity is greater than that of the preforms, in a contradistinction to the preceding tests.

Furthermore, all of the other parameters remain unchanged: weight and shape of the preforms and containers, material, stretching rate and factor, and length of the fabrication cycle.

The characteristics of the comparative PET bottles produced during the fourth and fifth series of tests are recorded in Table II, below.

TABLE II

|  | Single blowing with sweeping | Double blowing with sweeping |
|---|---|---|
| Appearance | Transparent | Transparent |
| Volume shrinkage after filling at 85-87° C. (in % as compared with the initial volume) | 3.4 | 2.8 |
| Reduction of the diameter of the body of the bottle after filling at 85-87° C. (in %) | 1.3 | 0.6 |
| Reduction of the height of the bottle after filling at 85-87° C. (in %) | 1.9 | 1.3 |

A comparison of Tables I and II shows, therefore, that the influence of the temperatures of the preforms and of the walls of the molding cavity, respectively, is essential for obtaining bottles which are deformed only slightly when filled with a hot liquid.

While the invention has been described in detail and with reference to specific embodiments thereof, it will be apparent to one skilled in the art that various changes and modifications can be made therein without departing from the spirit and scope thereof.

What is claimed is:

1. A process for the manufacture of a substantially non-biaxially oriented polyethylene terephthalate (PET) container from a hollow amorphous PET preform comprising an open end and a closed end, the open end forming a neck section having dimensions already conformed to its final size and shape, said container having a volume shrinkage of not more than 1% when filled with a hot liquid which reaches or exceeds a temperature of 85° C., comprising:
   (a) rapidly heating in an infrared radiating oven only the body of said PET preform for less than one minute, exclusive of the neck section, to a temperature of from 120° C. to 140° C. at which subsequent longitudinal and transverse stretching cause substantially no stresses in the PET;
   (b) transferring said hot preform from step (a) which is at a temperature of 120° C. to 140° C. to a mold whose walls are at a temperature of from 70° C. to 120° C.;
   (c) longitudinally stretching the preform body while simultaneously transversely expanding it by blow-molding using a pressurized fluid so as to mold the preform body to the shape of the mold cavity, wherein the longitudinal stretching rate is less than 500 mm/sec so as to induce minimal stresses in the body during molding and, during said blow-molding, the body is prevented from cooling below its glass transition temperature Tg;
   (d) rapidly evacuating the pressurized fluid from the molded container of step (c) by arresting circulation of the pressurized fluid and by drawing off the pressurized fluid within the container until pressure reaches atmospheric pressure; and
   (e) removing said container from the mold.

2. A process according to claim 1, wherein during step (c), the biaxial stretching factor is between 7 and 9.

3. A process according to claim 1, wherein the pressurized fluid is blown into the preform in an amount sufficient to create an internal preform pressure of between 20 and 40 bars.

4. A process according to claim 3, wherein after rapidly evacuating the pressurized fluid from the molded container so that the residual pressure within the container is between 0 and 6 bars, a second blowing step is conducted whereby pressurized fluid is blown into the container to create an internal pressure between 20 and 40 bars.

5. A process according to claim 4, wherein the pressurized fluid used in the first and second blowing steps is air.

6. A process according to claim 1, wherein the container temperature upon removal from the mold in step (e) is between 70° C. and 80° C.

7. A process according to claim 1, wherein during step (c), the pressurized fluid is blown into the preform to create an internal pressure of between 20 and 40 bars, and the pressurized fluid is forced to circulate under pressure within the molded container, the circulating air being under a pressure of between 15 and 30 bars.

8. A process according to claim 1, wherein during step (c), the pressurized fluid is blown into the preform to create an internal pressure of between 20 and 40 bars, rapidly evacuating the pressurized fluid from the molded container as in step (d) to create a residual pressure within the molded container of between 0 and 6 bars, introducing the pressurized fluid again into the container to create an internal pressure of between 20 and 40 bars, forcing the pressurized fluid to circulate within the molded container, the circulating air being under a pressure of from 15 to 30 bars, and then carrying out said step (d).

9. A process according to claim 1, wherein the container is present in the molding cavity for a period of from 4 to 5.5 seconds.

* * * * *